(12) United States Patent
Praisner et al.

(10) Patent No.: US 10,138,748 B2
(45) Date of Patent: Nov. 27, 2018

(54) GAS TURBINE ENGINE COMPONENTS WITH OPTIMIZED LEADING EDGE GEOMETRY

(71) Applicant: UNITED TECHNOLOGIES CORPORATION, Hartford, CT (US)

(72) Inventors: Thomas J. Praisner, Colchester, CT (US); Paul M. Lutjen, Kennebunkport, ME (US); Ken F. Blaney, Middleton, NH (US); Anthony B. Swift, North Waterboro, ME (US); Neil L. Tatman, Brentwood, NH (US); Christopher M. Jarochym, Ogunquit, ME (US)

(73) Assignee: United Technologies Corporation, Farmington, CT (US)

( * ) Notice: Subject to any disclaimer, the term of this patent is extended or adjusted under 35 U.S.C. 154(b) by 331 days.

(21) Appl. No.: 14/997,323

(22) Filed: Jan. 15, 2016

(65) Prior Publication Data
US 2017/0204735 A1    Jul. 20, 2017

(51) Int. Cl.
*F01D 11/08* (2006.01)
*F01D 5/14* (2006.01)
(Continued)

(52) U.S. Cl.
CPC ............... *F01D 11/08* (2013.01); *F01D 5/12* (2013.01); *F01D 5/143* (2013.01); *F01D 25/246* (2013.01); *F01D 11/001* (2013.01); *F05D 2220/32* (2013.01); *F05D 2240/11* (2013.01); *F05D 2250/14* (2013.01); *F05D 2250/70* (2013.01); *Y02T 50/673* (2013.01)

(58) Field of Classification Search
CPC ........ F01D 25/246; F01D 11/08; F01D 25/12; F01D 5/12; F01D 11/12; F01D 11/122; F01D 11/125; F01D 11/127; F01D 11/14; F05D 2260/204; F05D 2260/202; F05D 2240/81; F05D 2240/11; F05D 2220/32; F05D 2250/70; F05D 2250/14; F05D 2250/16; F05D 2250/24; F05D 2250/26; F05D 2250/71; F05D 2250/711; F05D 2240/57

See application file for complete search history.

(56) References Cited

U.S. PATENT DOCUMENTS

| | | | |
|---|---|---|---|
| 6,398,158 B1* | 6/2002 | Reeves | B60V 1/08 244/105 |
| 2008/0089787 A1* | 4/2008 | Abdel-Messeh | F01D 5/187 416/179 |
| 2009/0285675 A1* | 11/2009 | Lewis | F01D 11/12 415/173.1 |

FOREIGN PATENT DOCUMENTS

| | | |
|---|---|---|
| EP | 1914390 | 4/2008 |
| EP | 3081762 | 10/2016 |

OTHER PUBLICATIONS

Extended European Search Report dated Apr. 11, 2017 in European Application No. 16198828.2.

* cited by examiner

*Primary Examiner* — Logan Kraft
*Assistant Examiner* — Justin A Pruitt
(74) *Attorney, Agent, or Firm* — Snell & Wilmer L.L.P.

(57) ABSTRACT

A gas turbine engine component is provided. The gas turbine engine component comprises a main body having a leading edge and a leading edge wall including an elongated transition portion extending between the leading edge and a proximate flowpath surface of the main body. The elongated transition portion has an axial length that is greater than a radial height. A gas turbine engine is also provided.

20 Claims, 6 Drawing Sheets

(51) Int. Cl.
*F01D 25/24* (2006.01)
*F01D 5/12* (2006.01)
*F01D 11/00* (2006.01)

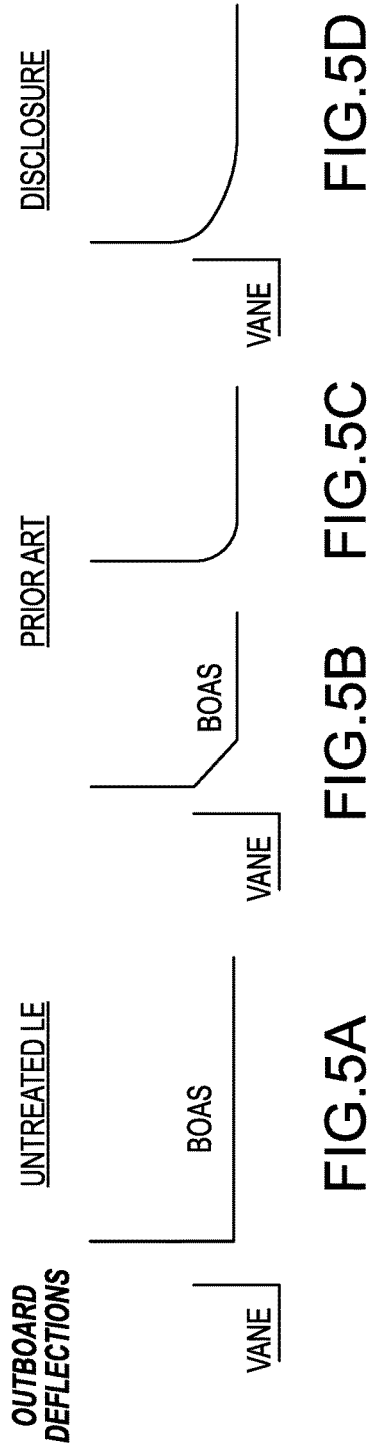

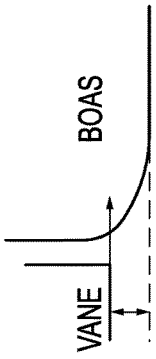
*INBOARD DEFLECTIONS*
UNTREATED LE
FIG.5E
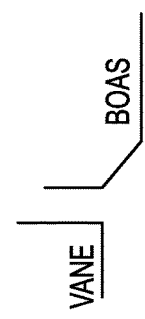
PRIOR ART
FIG.5F
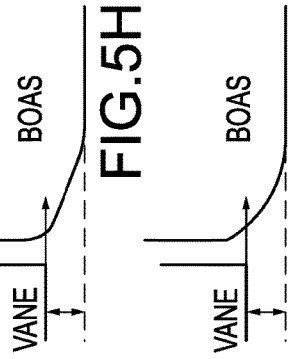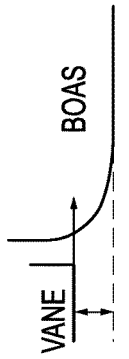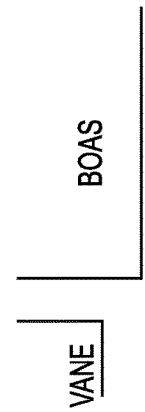
DISCLOSURE
FIG.5G
FIG.5H
FIG.5I
FIG.5J

GAS TURBINE ENGINE COMPONENTS WITH OPTIMIZED LEADING EDGE GEOMETRY

GOVERNMENT LICENSE RIGHTS

This disclosure was made with government support under Contract No. FA8650-09-D-2923 0021 awarded by the United States Air Force. The government has certain rights in the disclosure.

FIELD

The present disclosure relates to gas turbine engines. In particular, the disclosure relates to gas turbine engine components with optimized leading edge geometry.

BACKGROUND

Gas turbine engines, and other turbomachines, include multiple sections, such as a fan section, a compressor section, a combustor section, a turbine section, and an exhaust section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections.

A blade outer air seal (BOAS) array includes blade outer air seal (BOAS) segments circumferentially disposed about at least a portion of the airfoil arrays. As known, the blade outer air seal environment is exposed to temperature extremes and other harsh environmental conditions, which may affect the integrity of the blade outer air seal segments. In addition, high relative movements/displacements between the BOAS segment/array (an exemplary gas turbine engine component) and surrounding static hardware (e.g., stator vanes) due to the varying thermal environment in the operational temperature range may, in particular, expose a leading edge portion of the BOAS to high heat loads, potentially shortening BOAS life and/or compelling additional cooling flow. The leading edge portion of other gas turbine engine components may also be exposed to high heat loads due to high relative movements/displacements between the static hardware and the gas turbine engine component, potentially shortening the life of the gas turbine engine component and/or compelling additional cooling flow.

SUMMARY

A gas turbine engine component is provided, according to various embodiments. The gas turbine engine component comprises a main body having a leading edge and a leading edge wall including an elongated transition portion extending between the leading edge and proximate flowpath surface of the main body. The elongated transition portion has an axial length that is greater than a radial height.

A gas turbine engine is provided, according to various embodiments. The gas turbine engine comprises a blade stage and a circumferential array of blade outer air seal segments in the blade stage. A blade outer seal segment (BOAS) comprises a main body that extends axially with respect to a central axis from a leading edge portion of the main body to a trailing edge portion of the main body. The leading edge portion of the BOAS includes a leading edge and a leading edge wall including an elongated transition portion extending between the leading edge and an inner diameter flowpath surface of the main body. The elongated transition portion has an axial length that is greater than a radial height.

A gas turbine engine is provided, according to various embodiments. The gas turbine engine comprises an engine case, a turbine stage comprising a stator vane and a rotor blade, and a gas turbine engine component. The gas turbine engine component comprises a main body having a leading edge and a leading edge wall including an elongated transition portion extending between the leading edge and a proximate flowpath surface of the main body. The elongated transition portion has an axial length that is greater than a radial height.

In any of the foregoing embodiments, a static structure is configured to be disposed adjacent and upstream of the gas turbine engine component in a gas turbine engine and each of the static structure and the gas turbine engine component is configured to move relative to each other because of thermal or mechanical deflections. The elongated transition portion has an axial length that is greater than a radial height by up to one order of magnitude. The axial length of the elongated transition portion is about three to about ten times the radial height of the elongated transition portion. The elongated transition portion is configured as an ellipse with an elliptical factor of greater than about 3, wherein the elliptical factor is defined as a length of a major axis divided by the length of a minor axis. The elongated transition portion has a first tangency point and a second tangency point and the axial length comprises a length between the leading edge and the second tangency point. The elongated transition portion has a chamfer of less than about 18 degrees combined with a radius. The elongated transition portion is configured as a chamfer blended with a radius to at least one of the leading edge or the proximate flowpath surface of the main body. The gas turbine engine component comprises a blade outer air seal (BOAS) segment.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein:

FIGS. 5A through 5J are schematic views of the leading edge portion of an exemplary gas turbine engine component (a BOAS segment in the depicted embodiment) deflected relative to an upstream static structure (a stator vane in the depicted embodiment), a leading edge wall of the exemplary gas turbine engine component including a conventional (including an untreated leading edge portion) transition portion (FIGS. 5A-5C and FIGS. 5E-5F) and an elongated transition portion according to various embodiments (FIGS. 5D and 5G-5J).

DETAILED DESCRIPTION

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. It is to be understood that unless specifically stated otherwise, references to "a," "an," and/or "the" may include one or more than one and that reference to an item in the singular may also include the item in the plural.

Various embodiments are directed to gas turbine engines and gas turbine engine components such as blade outer air seal (BOAS) segments with optimized leading edge geometry. Relative movement or shifts due to the varying thermal environment between a non-rotating component and an adjacent BOAS in a turbine or compressor stage of a gas turbine engine can result in a leading edge portion of the BOAS projecting into the hot core flowpath of the gas turbine engine, resulting in a high heat load for the BOAS leading edge portion, thereby shortening BOAS life and/or compelling additional cooling. Various embodiments permit the hot core flowpath air to impinge on the BOAS leading edge portion at a reduced incidence angle (relative to conventional leading edge geometry), thereby minimizing exposure of the BOAS leading edge portion to high heat transfer coefficients from the hot core flowpath air and thus extending BOAS life and/or minimizing cooling requirements. While a BOAS segment having a leading edge portion with an optimized geometry is described herein, it is to be understood that the BOAS segment is an exemplary gas turbine engine component and that other gas turbine engine components may benefit from an optimized leading edge geometry according to various embodiments.

Figure 1:
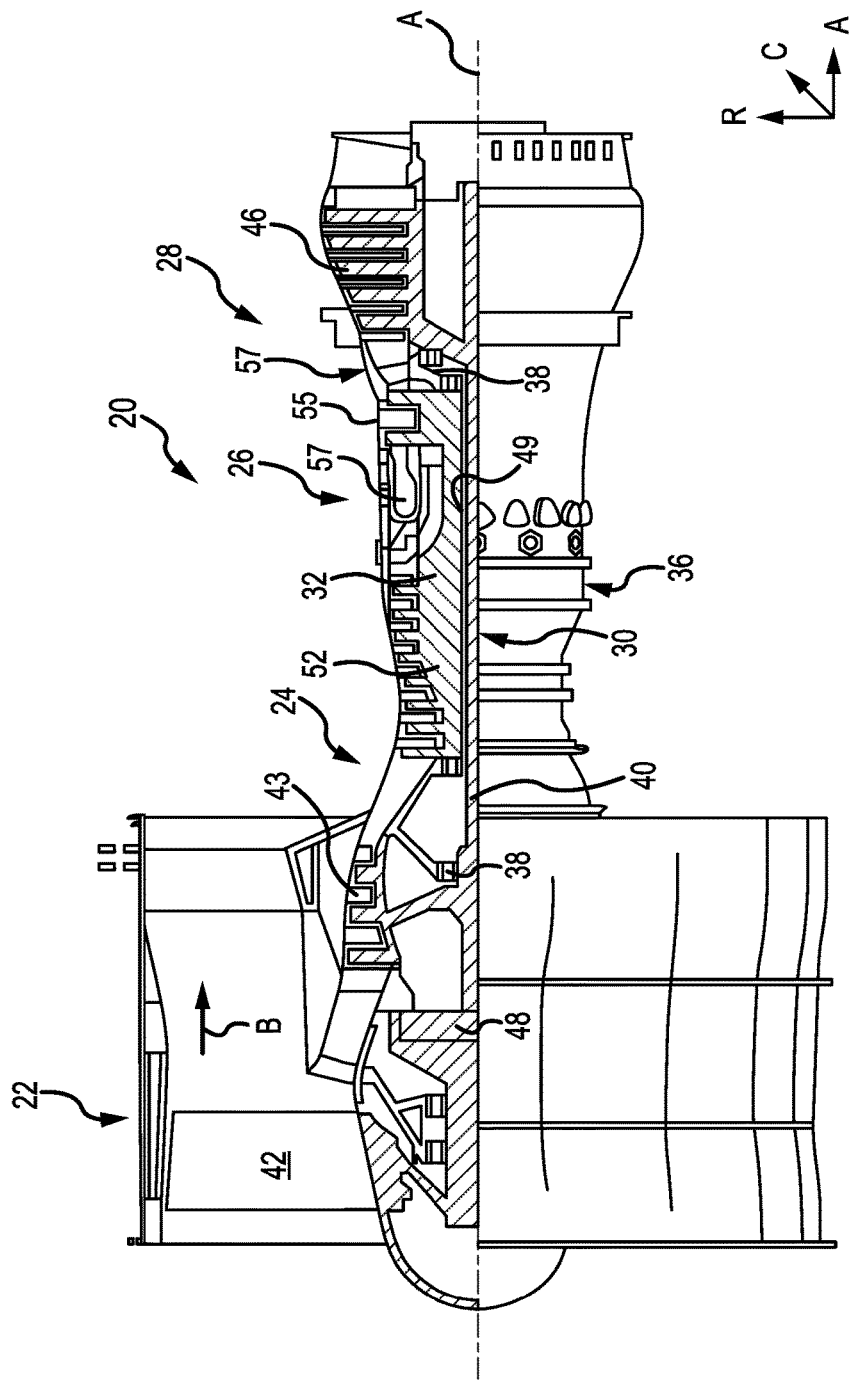
FIG. 1 shows a cross-section of a gas turbine engine, according to various embodiments.

According to various embodiments, and with reference to FIG. 1, a gas turbine engine 20 is schematically illustrated. According to various embodiments, gas turbine engine 20 may be a two-spool turbofan that generally incorporates a fan section 22, a compressor section 24, a combustor section 26 and a turbine section 28, for example. Alternative engines might include an augmentor section (not shown) among other systems or features, according to various embodiments. According to various embodiments, the fan section 22 drives air along a bypass flowpath B while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures, non-geared turbine engines, and land-based turbines, according to various embodiments.

According to various embodiments, gas turbine engine 20 may generally include a first spool 30 and a second spool 32 mounted for rotation about an engine central axis A relative to an engine static structure 36 via several bearing systems 38. It should be understood that various bearing systems 38 at various locations may alternatively or additionally be provided, according to various embodiments. According to various embodiments, the first spool 30 may generally include a first shaft 40 that interconnects a fan 42, a first compressor 43 and a first turbine 46. According to various embodiments, the first shaft 40 may be connected to the fan 42 through a gear assembly of a fan drive gear system 48 to drive the fan 42 at a lower speed than the first spool 30. According to various embodiments, the second spool 32 may include a second shaft 49 that interconnects a second compressor 52 and second turbine 55. According to various embodiments, the first spool 30 may run at a relatively lower pressure than the second spool 32. It is to be understood that "low pressure" and "high pressure" or variations thereof as used herein are relative terms indicating that the high pressure is greater than the low pressure. According to various embodiments, an annular combustor 57 may be arranged between the second compressor 52 and the second turbine 55. According to various embodiments, the first shaft 40 and the second shaft 49 may be concentric and rotate via bearing systems 38 about the engine central axis A which is collinear with their longitudinal axes, according to various embodiments.

According to various embodiments, the core airflow may be compressed by the first compressor 43 then the second compressor 52, mixed and burned with fuel in the annular combustor 57, then expanded over the second turbine 55 and first turbine 46. According to various embodiments, the first turbine 46 and the second turbine 55 may rotationally drive, respectively, the first spool 30 and the second spool 32 in response to the expansion. According to various embodiments, gas turbine engine 20 may be a high-bypass geared aircraft engine that has a bypass ratio that is greater than about six (6), with an example embodiment being greater than ten (10). According to various embodiments, the gear assembly of the fan drive gear system 48 may be an epicyclic gear train, such as a planetary gear system or other gear system, with a gear reduction ratio of greater than about 2.3:1 and the first turbine 46 may have a pressure ratio that is greater than about 5, for example. According to various embodiments, the first turbine 46 pressure ratio is pressure measured prior to inlet of first turbine 46 as related to the pressure at the outlet of the first turbine 46 prior to an exhaust nozzle. According to various embodiments, first turbine 46 may have a maximum rotor diameter and the fan 42 may have a fan diameter such that a ratio of the maximum rotor diameter divided by the fan diameter is less than 0.6. It should be understood, however, that the above parameters are only exemplary.

A significant amount of thrust may be provided by the bypass flow B due to the high bypass ratio. According to various embodiments, the fan section 22 of the gas turbine engine 20 may be designed for a particular flight condition—typically cruise at an airspeed of 0.8 Mach and altitude of 35,000 feet (10.67 km). The flight condition of 0.8 Mach and 35,000 feet (10.67 km) may be a condition at which an engine is operating at its best fuel consumption. To make an accurate comparison of fuel consumption between engines, fuel consumption is reduced to a common metric which is applicable to all types and sizes of turbojets and turbofans. The term that may be used to compare fuel consumption between engines is thrust specific fuel consumption, or TSFC. This is an engine's fuel consumption in pounds per hour divided by the net thrust. Stated another way, TSFC is the amount of fuel required to produce one pound of thrust. The TSFC unit is pounds per hour per pounds of thrust (lb/hr/lb Fn). When the reference is to a turbojet or turbofan engine, TSFC is often simply called specific fuel consumption, or SFC. "Low fan pressure ratio" is the pressure ratio across the fan blade alone, without a fan exit guide vane system. The low fan pressure ratio as disclosed herein according to one non-limiting embodiment is less than about 1.45. "Low corrected fan tip speed" is the actual fan tip speed in feet per second divided by an industry standard temperature correction of $[(T_{ram}° R)/(518.7° R)]^{0.5}$. The "Low corrected fan tip speed" as disclosed herein according to one non-limiting embodiment may be less than about 1150 feet per second (350 m/s).

Figure 2:
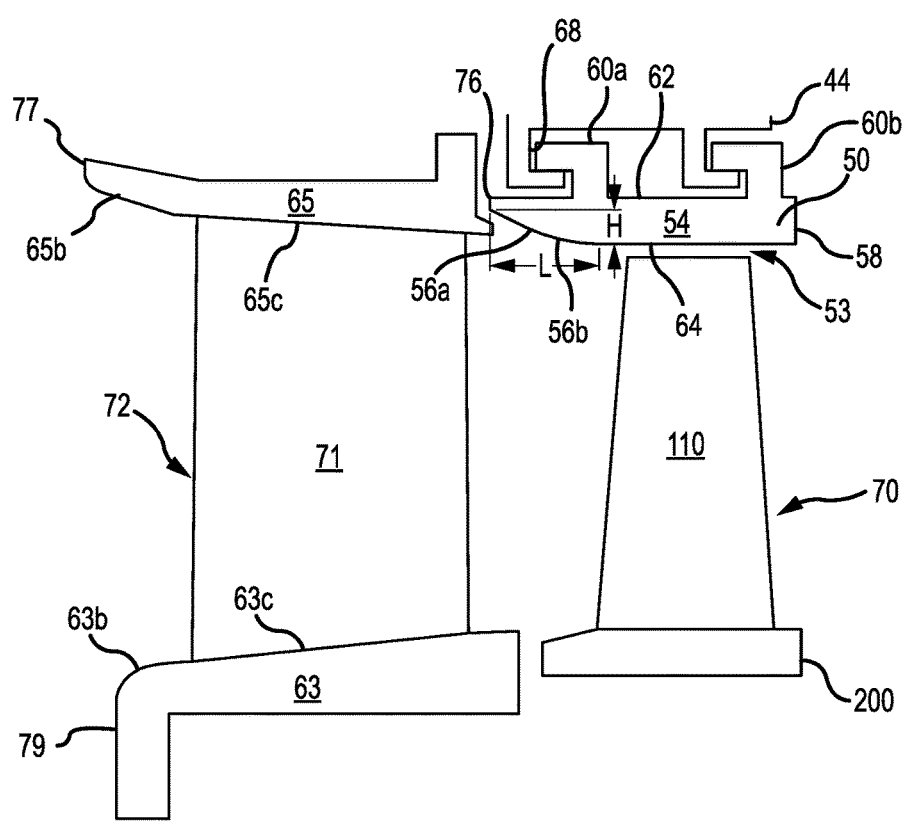
FIG. 2 schematically shows one of the turbine stages in the turbine section of the gas turbine engine of FIG. 1 (e.g., a first stage of a high pressure turbine (HPT)) and its associated array of blade outer air seal segments (a single blade outer air seal segment is shown), according to various embodiments.

Each of the first and second compressors 43 and 52 and first and second turbines 46 and 55 in the gas turbine engine 20 comprises interspersed stages of rotor blades 70 and stator vanes 72. The rotor blades 70 rotate about the centerline with the associated shaft while the stator vanes 72 remain stationary about the centerline. The first and second compressors 43 and 52 in the gas turbine engine may each comprise one or more compressor stages. The first and second turbines 46 and 55 in the gas turbine engine 20 may each comprise one or more turbine stages. Each compressor stage and turbine stage may comprise multiple sets of rotating blades ("rotor blades") and stationary vanes ("stator vanes"). For example, FIG. 2 schematically shows, by example, a first turbine stage of the second turbine 55 (a high-pressure turbine (HPT)) in the turbine section of the gas turbine engine. Unless otherwise indicated, the term "blade stage" refers to at least one of a turbine stage or a compressor stage.

With continued reference to FIGS. 1 and 2, according to various embodiments, the depicted first turbine stage of the HPT comprises the rotor blade 70 and the stator vane 72. The stator vane 72 may have an inner stator vane platform 63 and an outer stator vane platform 65. The rotor blade 70 may comprise a blade airfoil section 100 and a platform 200, such as a rotor blade platform. A blade outer air seal (BOAS) segment 50 is attached to an engine case structure 44 of the gas turbine engine 20 by a receiving portion 68 of the engine case structure 44. The BOAS segment 50 faces the rotor blade 70 (an exemplary turbine blade in FIG. 2) to define a radial tip clearance 53 between the rotor blade 70 and the BOAS segment 50 (more particularly, between a proximate inner diameter flowpath surface 64 of the BOAS and the turbine blade tip). A minimal radial tip clearance 53 is sought to be maintained as the smaller the clearance, the greater the turbine efficiency. The BOAS segment 50 locally bounds the radially outboard extreme of the core flowpath through the gas turbine engine 20. Although only one BOAS segment 50 is shown in FIG. 2, the turbine stage comprises an associated array of blade outer air seal segments. A number of BOAS segments 50 may be arranged circumferentially about engine axis A to form a shroud, according to various embodiments. According to various embodiments, the BOAS segments 50 may alternatively be formed as a unitary BOAS structure, with the same features described herein.

Figure 3:
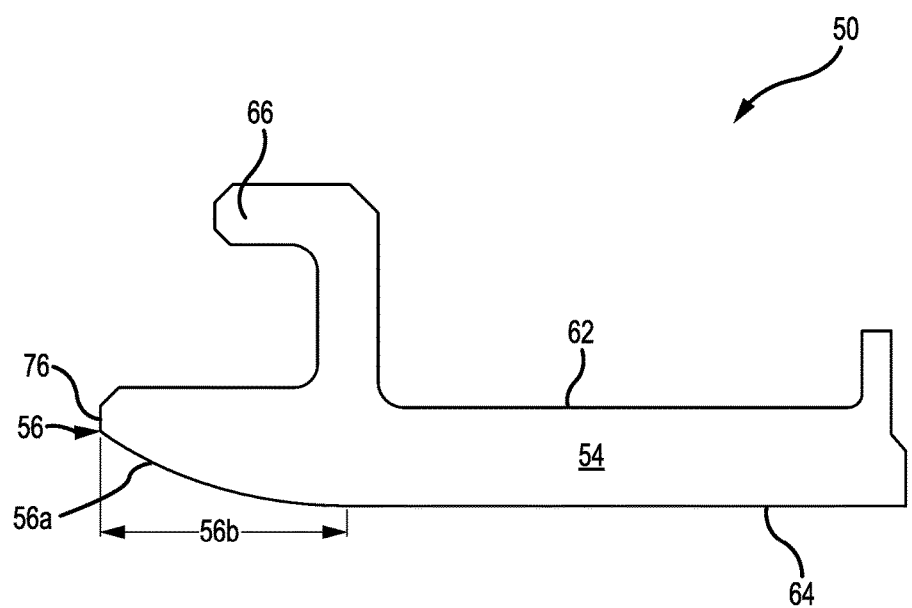
FIG. 3 shows a sectional view of another BOAS segment in isolation, the BOAS segment having an optimized leading edge geometry defined by a leading edge wall including an elongated transition portion extending between a leading edge of the BOAS segment and an inner diameter flowpath surface of the BOAS segment, according to various embodiments.

Still referring to FIG. 2 and now specifically to FIG. 3, according to various embodiments, the BOAS segment 50 may include a main body 54 that extends generally axially from a leading edge portion 56 to a trailing edge portion 58 and from a radially outward facing surface 62 at an outboard side of BOAS segment 50 to the inner diameter flowpath surface 64 at an inboard side of BOAS segment 50. The leading edge portion 56 of BOAS segment 50 includes a leading edge 76 and a leading edge wall 56a. In accordance with various embodiments, the leading edge wall 56a includes an elongated transition portion 56b that extends between the leading edge 76 and the inner diameter flowpath surface 64 of the BOAS segment as hereinafter described. The BOAS segment 50 also includes at least one leading attachment portion 60a (also referred to as "attachment portions 60a") disposed at or near the leading edge portion 56 and at least one trailing attachment portion 60b (also referred to as "attachment portions 60b") disposed at or near the trailing edge portion 58. Each of the attachment portions 60a, 60b may define a flange 66. Flange 66 of attachment portions 60a and/or 60b may extend in an axially aft direction. Flange 66 of attachment portions 60a and/or 60b may alternatively extend in an axially forward direction, as shown in the figures. Flange 66 of attachment portions 60a and/or 60b may alternatively extend in and/or out of the page. Each axially extending flange 66 corresponds to the receiving portion 68 of the engine case structure 44 to support and attach the BOAS segment 50 (shown schematically in FIG. 2). According to various embodiments, the attachment portions 60a may be circumferentially offset, circumferentially aligned, or a combination of both, from the attachment portions 60b in response to BOAS segment 50 parameters.

Figure 4:
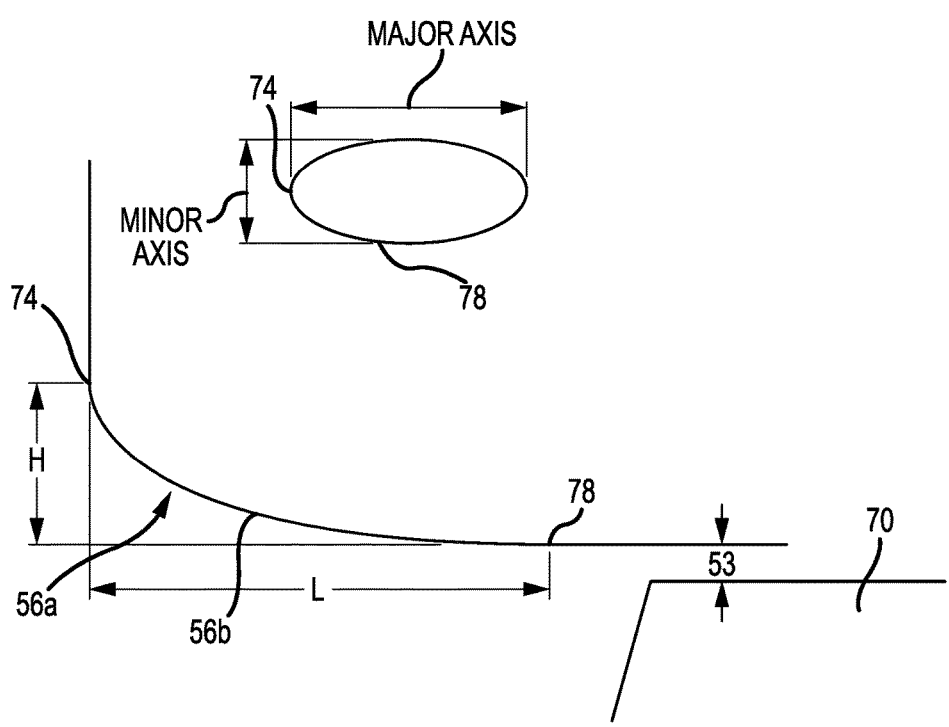
FIG. 4 is a schematic view of an elongated transition portion of an exemplary BOAS segment having an optimized leading edge geometry, the elongated transition portion configured as an ellipse, according to various embodiments.

Still referring to FIGS. 2 and 3 and now to FIG. 4, according to various embodiments, and as noted previously, the leading edge portion 56 of the BOAS segment has an elongated transition portion 56b extending from the leading edge 76 to the inner diameter flowpath surface 64. The elongated transition portion 56b, which may have various configurations as hereinafter described, defines an optimized leading edge geometry that deviates away from a conventional leading edge geometry (see, e.g., FIGS. 5A through 5H). The elongated transition portion 56b has an axial length (L) that is greater than a radial height (H), of up to one order of magnitude. The axial length of the elongated transition portion 56b is about three to about ten times the radial height of the elongated transition portion 56b. In various embodiments, the axial length may be defined as the length between a first tangency point 74 or the leading edge (face) 76 and the leading edge wall 56a and a second tangency point 78 and the inner diameter flowpath surface 64 and the radial height is defined as the radial distance between the inner diameter flowpath surface 64 and the leading edge wall.

Still referring to FIGS. 2 through 4 and now specifically to FIG. 5D, according to various embodiments, the elongated transition portion 56b may be configured as an ellipse. The ellipse may have an elliptical factor of greater than about 3, wherein the elliptical factor is defined as a length of a major axis divided by the length of a minor axis. Referring now specifically to FIGS. 5G and 5H, according to various embodiments, the elongated transition portion may be configured with the ellipse (FIG. 5G) or with a chamfer in combination with a radius (FIG. 5H). A degree of the chamfer is less than about 18 degrees. The shape of the elongated transition portion (the ellipse) in FIG. 5G is the same as the shape of the elongated transition portion in FIG. 5D.

As herein described, the leading edge portion (more particularly, the elongated transition portion) of the BOAS segment (and other gas turbine engine components) has a geometry such that over an operational temperature range, thermal and/or mechanical deflections of a non-rotating structure (e.g., the upstream stator vane 72 depicted in FIG. 2) upstream of the BOAS array relative to thermal and/or mechanical deflections of the BOAS array cause relative movement of the non-rotating structure and the BOAS array to expose the leading edge portion of the BOAS to hot core flowpath air. The BOAS array may be radially deflected outboard of the upstream non-rotating structure as shown in FIGS. 5A through 5D (a "waterfall condition") or radially deflected inboard of the upstream non-rotating structure as shown in FIGS. 5E through 5J (a "dam condition").

More specifically, FIG. 5A depicts a BOAS segment/array with an untreated (i.e., not configured in accordance with various embodiments) leading edge portion. FIGS. 5B and 5C depict a BOAS segment/array with a conventional transition between the leading edge wall and the inner diameter flowpath surface 64, with FIG. 5B depicting a conventional chamfer and FIG. 5C depicting a conventional radius. As a result, the leading edge portion of the BOAS segment/array in each of FIGS. 5A, 5B, and 5C is fully exposed to hot core flowpath air ("hot gas flow"). By contrast, the BOAS segment/array in FIG. 5D has the elongated transition portion configured as the ellipse in accordance with various embodiments, such that the hot core flowpath air is transitioned from the upstream vane to the BOAS array with a reduced incidence angle (relative to the conventional or untreated leading edge geometry) accommodating an increased range of relative radial deflection.

As noted previously, the BOAS array may alternatively be radially deflected inboard of the upstream non-rotating structure (a "dam condition) as shown in FIGS. 5E through 5H. FIG. 5E depicts a BOAS segment/array with an untreated (i.e., not configured in accordance with various embodiments) leading edge portion. FIG. 5F depicts a BOAS segment/array with a conventional chamfered transition between the leading edge wall and the inner flowstream path. As a result of the relative radial deflection between the upstream non-rotating component (a stator vane in the depicted embodiment) and the adjacent BOAS segment/array, the leading edge portion of the BOAS segment/array in each of FIGS. 5E and 5F is fully exposed to hot core flowpath air and high heat transfer coefficients. By contrast, the BOAS segment/array in FIG. 5G has the elongated transition portion configured as an ellipse in accordance with various embodiments, so as to permit more deflection of the hot core flowpath air off the leading edge portion of the BOAS segment/array relative to an untreated or conventional BOAS segment/array (FIGS. 5A-5C and 5E-5F). As noted previously, the BOAS segment/array in FIG. 5H has an elongated transition portion configured as a chamfer with a blended radius in accordance with various embodiments, so as to also permit more deflection of the hot core flowpath air off the leading edge portion of the BOAS segment/array relative to an untreated or conventional BOAS segment/array (FIGS. 5A-5C and 5E-5F). The elongated transition portion configured as a chamfer with blended radii as depicted in FIG. 5H is also easier to make and inspect relative to other transitions. FIG. 5I is a schematic view of the leading edge portion of an exemplary BOAS segment in the depicted embodiment) illustrating that a transition of the elongated transition portion to the leading edge (face) of the BOAS segment may produce a corner rather than a tangent as in FIGS. 5D and 5G-5H, according to various embodiments. FIG. 5J is a schematic view of the leading edge portion of an exemplary BOAS segment illustrating an elongated transition portion comprising a short chamfer between two radii.

During gas turbine engine 20 operation, and over the operational temperature range, the BOAS segment 50 is subjected to different thermal loads and environmental conditions (i.e., the thermal environment surrounding each turbine or compressor stage varies during operation). As a result, the thermal and/or mechanical deflections of the non-rotating structure adjacent to the BOAS segment array and the thermal and/or mechanical deflections of the BOAS segment array may be such that relative movement exposes the leading edge portion to hot core flowpath air. According to various embodiments, the leading edge portion is configured such that the hot core flowpath air is transitioned from the upstream non-rotating structure (e.g., the upstream stator vane) to the BOAS array with a reduced incidence angle that accommodates an increased range of relative radial deflections. The variation in the radial clearance between the stationary vane and the adjacent BOAS is a result of how the outer stator vane platform 65 and the engine case structure 44 react different to the varying thermal environment.

For example, in the first stage of the high pressure turbine (HPT) (the designation "T1" referring to the first stage of the HPT) depicted in FIG. 2, a transition of the outer stator vane platform 65 to the leading edge of the BOAS is defined to yield a smooth core flowpath at steady state conditions for maximum efficiency, typically at cruise conditions. However, relative motion or shifts between the T1 stator vane and the T1 BOAS segment due to the varying thermal environment can result in the BOAS leading edge portion moving radially outboard of the outer stator vane platform 65 (outer diameter platform) of the T1 stator vane, creating an outward step in the hot core flowpath from the outer stator vane platform 65 and BOAS (see, e.g., FIGS. 5A through 5D). Relative motion or shifts may also result in the BOAS leading edge portion moving radially inboard of the outer stator vane platform 65 (outer diameter platform) of the T1 stator vane, making the BOAS leading edge portion project into the hot core flowpath (see, e.g., FIGS. 5E through 5H). As noted previously, this results in higher heat load for the BOAS leading edge portion, shortening its life and/or compelling additional cooling.

However, according to various embodiments, the elongated transition portion 56b may improve gas flow transition across the leading edge wall 56a, and may prevent a stagnation region at the leading edge portion 56. More particularly, various embodiments permit the transition from the upstream stator vane to the leading edge of the BOAS to be smoother and the leading edge portion less sensitive to being projected into the hot core flowpath air as a result of the relative movement/shifting of the BOAS segment and the surrounding static structure (e.g., the upstream stator vanes). As a result, various embodiments prolong BOAS life and/or tend to minimize cooling flow requirements for the BOAS segment/array, thereby maximizing turbine efficiency.

While various embodiments have been described to ease the transition between an upstream stator vane and an adjacent BOAS segment in a turbine stage, it is to be understood that various embodiments may be used to smooth the transition between adjacent non-rotating structures. As depicted in FIG. 2, the proximate flowpath surface for the BOAS leading edge 76 of the main body 54 of BOAS segment 50 is the inner diameter flowpath surface 64. Similar to elongated transition portion 56b of BOAS segment 50, the stator vane 72 has an elongated transition portion 65b on outer stator vane platform 65 that transitions from a static combustor panel (not shown) at an outer platform leading edge 77 to the proximate flowpath surface 65c, the boundary between outer stator vane platform 65 and an airfoil 71 of stator vane 72. Likewise, inner stator vane platform 63 includes an elongated transition portion 63b that extends from an inner platform leading edge 79 to a proximate flowpath surface 63c, the boundary between the elongated transition portion 63b and the airfoil 71 of stator vane 72. Hence, the "proximate flowpath surface" may be an inner flowpath surface or an outer flowpath surface.

In addition, while the first turbine stage of a HPT is depicted in FIG. 2, it is to be understood that various embodiments may be utilized for static gas turbine engine components in any turbine stage of the HPT or low-pressure turbine (LPT) (i.e., first turbine) and in any compressor stage of the high-pressure compressor (HPC) (i.e., second compressor) or the low-pressure compressor (LPC) (i.e., first compressor). While a BOAS segment having specially configured leading edge geometry for deflecting hot core flowpath air has been described in accordance with various embodiments, it is to be understood that other gas turbine engine components may benefit from an optimized leading edge geometry according to various embodiments. For example, mechanical and thermal deflections of a non-rotating structure adjacent to a gas turbine engine component may be such that relative movement exposes a leading edge portion of the gas turbine engine component to hot core flowpath air. The leading edge portion of the gas turbine engine component may be configured with the optimized leading edge geometry in accordance with various embodiments such that the hot core flowpath air is transitioned from the upstream non-rotating structure to the gas turbine engine component with reduced incidence angle that accommodates an increased range of relative radial deflections. Other exemplary gas turbine engine components that may benefit from various embodiments include, but are not limited to, combustor panels, vane platforms, BOAS, Mid-turbine frames, Transition ducts, etc. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine component comprising: a main body having a leading edge and a leading edge wall including an elongated transition portion configured as a section of an ellipse extending between the leading edge and a proximate flowpath surface of the main body, wherein the section comprises a portion defined between an intersection of a major axis with the ellipse and an intersection of a minor axis with the ellipse, wherein the length of the major axis is greater than the length of the minor axis, and wherein the elongated transition portion has an axial length that is greater than a radial height.

2. The gas turbine engine component of claim 1, wherein a static structure is configured to be disposed adjacent and upstream of the gas turbine engine component in a gas turbine engine and each of the static structure and the gas turbine engine component is configured to move relative to each other because of thermal or mechanical deflections.

3. The gas turbine engine component of claim 2, wherein the elongated transition portion has an axial length that is greater than a radial height by up to one order of magnitude.

4. The gas turbine engine component of claim 3, wherein the axial length of the elongated transition portion is about three to about ten times the radial height of the elongated transition portion.

5. The gas turbine engine component of claim 3, wherein the section of an ellipse has an elliptical factor of greater than about 3, wherein the elliptical factor is defined as a length of the major axis divided by the length of the minor axis, wherein the major axis is parallel to an axis of rotation of the gas turbine engine.

6. The gas turbine engine component of claim 5, wherein the elongated transition portion has a first tangency point and a second tangency point and the axial length comprises a length between the first tangency point and the second tangency point.

7. The gas turbine engine component of claim 3, wherein the elongated transition portion has a chamfer of less than about 18 degrees combined with a radius.

8. The gas turbine engine component of claim 7, wherein the elongated transition portion is configured as a chamfer blended with a radius to at least one of the leading edge or the proximate flowpath surface of the main body.

9. The gas turbine engine component of claim 1, wherein the gas turbine engine component comprises a blade outer air seal (BOAS) segment.

10. A gas turbine engine comprising: a blade stage; and a circumferential array of blade outer air seal segments in the blade stage, a blade outer seal (BOAS) segment comprising: a main body that extends axially with respect to a central axis from a leading edge portion of the main body to a trailing edge portion of the main body, wherein the leading edge portion of the BOAS segment includes a leading edge and a leading edge wall including an elongated transition portion extending between the leading edge and an inner diameter flowpath surface of the main body, wherein the elongated transition portion has an axial length that is greater than a radial height, wherein the elongated transition portion is configured as a section of an ellipse, wherein the section comprises a portion defined between an intersection of a major axis with the ellipse and an intersection of a minor axis with the ellipse, and wherein the length of the major axis is greater than the length of the minor axis.

11. The gas turbine engine of claim 10, wherein the axial length of the elongated transition portion is about three to about ten times the radial height of the elongated transition portion.

12. The gas turbine engine of claim 10, wherein the ellipse has an elliptical factor of greater than about 3, wherein the elliptical factor is defined as a length of the major axis divided by the length of the minor axis, wherein the major axis is parallel to an axis of rotation of the gas turbine engine.

13. The gas turbine engine of claim 10, wherein the elongated transition portion has a chamfer of less than about 18 degrees.

14. The gas turbine engine of claim 13, wherein the elongated transition portion is configured as a chamfer blended with a radius to at least one of the leading edge or the inner diameter flowpath surface of the main body.

15. A gas turbine engine comprising: an engine case; a turbine stage comprising a stator vane and a rotor blade; and a gas turbine engine component comprising a main body having a leading edge and a leading edge wall including an elongated transition portion configured as a section of an ellipse extending between the leading edge and proximate flowpath surface of the main body, wherein the section comprises a portion defined between an intersection of a major axis with the ellipse and an intersection of a minor axis with the ellipse, wherein the length of the major axis is greater than the length of the minor axis, and wherein the elongated transition portion has an axial length that is greater than a radial height.

16. The gas turbine engine of claim 15, wherein the axial length of the elongated transition portion is about three to about ten times the radial height of the elongated transition portion.

17. The gas turbine engine of claim 15, wherein the elongated transition portion is further configured as at least one of a chamfer of less than 18 degrees or a chamfer of less than 18 degrees blended with a radius to at least one of the leading edge or the proximate flowpath surface of the main body.

18. The gas turbine engine of claim 17, wherein the elongated transition portion is configured as at least one of the ellipse having an elliptical factor of greater than about 3 wherein the major axis is parallel to an axis of rotation of the gas turbine engine, a chamfer of less than about 18 degrees, or a chamfer blended with a radius to at least one of the leading edge or the proximate flowpath surface of the main body.

19. The gas turbine engine of claim 15, wherein the gas turbine engine component comprises a blade outer air seal segment attached to the engine case and facing the rotor blade to locally bind a radially outboard extreme of a core flowpath through the gas turbine engine, the blade outer air seal segment comprising:
   a main body that extends axially with respect to a central axis from a leading edge portion of the main body to a trailing edge portion of the main body, wherein the leading edge portion includes a leading edge wall; and
   an elongated transition portion included in the leading edge wall, the elongated transition portion having an axial length that is greater than a radial height of the elongated transition portion by up to one order of magnitude.

20. The gas turbine engine of claim 15, wherein a static structure is configured to be disposed adjacent and upstream of the gas turbine engine component in the gas turbine engine and each of the static structure and the gas turbine engine component is configured to move relative to each other because of thermal or mechanical deflections.

* * * * *